United States Patent Office 2,874,056
Patented Feb. 17, 1959

2,874,056

MARGARINE OIL COMPOSITION

Ernest F. Drew, New York, N. Y.

No Drawing. Application November 8, 1957
Serial No. 695,202

9 Claims. (Cl. 99—118)

The present invention is directed to margarine compositions and more particularly to a composition having improved properties and more closely resembling butter than margarines previously on the market.

This application is a continuation-in-part of my copending application Serial No. 478,923, filed December 30, 1954, and now abandoned.

For many years a variety of vegetable oils, such as cottonseed, soybean, peanut and coconut oil etc. have been used when compounded with milk and other additives to produce vegetable margarine. The object has generally been to manufacture a product to resemble butter as nearly as possible. It is, therefore, desirable that the finished product should have a smooth texture, a delicate flavor such as would come only from cultured milk, good keeping qualities and a butter-like plasticity at refrigerator and body temperatures.

With the exception of the coconut type oils (often called lauric type oils) such as coconut, babassu and palm kernel oils, the other vegetable oils possess characteristics which makes it practically impossible to produce a butter-like margarine. For instance they all have high iodine numbers which inevitably tends towards instability of flavor and odor due to oxidization. This defect is only partly corrected by hydrogenation whereby the iodine number is reduced from upwards of 100 to around 75 and a further improvement is sometimes resorted to by adding a small proportion of coconut oil to the formula, reducing the average iodine number to 50 while the iodine number of butter fat is about 30.

The importance of the flavor factor in margarine should be understood because it is well recognized that only the slightest deterioration or reversion in flavor or odor removes the product from the butter-like class. This is accentuated by the fact that the flavor of the milk or cream in the margarine tends to decrease and the flavor of the margarine oils tends to rise and dominate that of the milk or cream. Furthermore by trying to overcome the natural instability of oils by hydrogenation, with the exception of the coconut type oils, the melting point of the fats is raised much above that of butter fat, which again conflicts with the desired quality.

Insofar as iodine number, flavor and keeping quality are concerned, coconut oil and other oils containing substantial quantities of lauric acid would be ideal as a base fat for margarine. However, the use of these oils has heretofore been limited by certain physical characteristics, namely, to become brittle at low temperatures and to rapidly and completely collapse at body temperature with the result that for the best quality margarine the formula generally has not included more than from 25% to 40% of coconut type oils.

The present invention is intended and adapted to overcome the deficiencies in prior compositions of the type described, it being among the objects thereof to provide a margarine made wholly from a coconut type oil suitably modified and having excellent taste and flavor.

It is also among the objects of the present invention to provide a method whereby natural coconut type oils can be modified by merely changing the proportions of their constituent fatty acids whereupon they will retain a butter-like plasticity at refrigerator temperatures and at the same time possess a butter-like gradual melting at body temperatures.

In practicing the present invention there is provided the general composition such as has been used in the past and containing in addition to the margarine oil such constituents as milk and/or cream, salt, lecithin and emulsifier. The improvement is in the composition of the fat which is a product of a coconut type oil modified by some of the constituents thereof. This is simply accomplished by combining with a coconut type oil certain proportions of the glycerol esters of some of the higher fatty acids of the coconut oil and glycerol esters of caprylic-capric-caproic acids, with the final result that the end product contains only the natural acids present in normal coconut oil but in modified proportions. Such combinations may be physical or chemical or may partake of both.

The esters of the lower fatty acids impart plasticity to the margarine and the esters of the higher fatty acids cause a gelling of the constituents of the margarine, whereby the margarine holds its shape over a very wide range of temperatures. As a result, even at summer temperatures, the margarine is firm and can be spread smoothly and readily. At lower temperatures, such as in the refrigerator, the gelled composition does not become brittle or hard so that it is readily usable immediately upon being taken from the refrigerator. In one aspect of the invention the glyceride of palmitic acid, derived from any suitable source, may be used and it is introduced as a physical mixture with the oil. It is surprising and unexpected that the glycerides of palmitic acid should have such an effect and only small amounts of the glycerides of palmitic acid are necessary in order to give the desired properties. Excellent results have been obtained by the introduction of about 4% to 8% of said palmitic glycerides. However, as little as 1% gives some results and up to 15% thereof is beneficial. The amount of the lower fatty acid esters ranges from about 1% to 20% and more specifically from 3% to 6%. The palmitic acid esters and the lower esters may contain in addition minor amounts of the esters of adjacent fatty acids in insufficient quantity to materially affect their properties.

It has been found that the rearranged coconut oil product in order to be satisfactory for the use described herein must have a Wiley melting point range of from 75° to 80° F. and a setting point of from 15° to 17° C. The final product after the addition of tripalmitin has a Wiley melting point range of from 95° to 100° F. and a setting point range of from 20° to 23° C. It can readily be appreciated that many combinations of interesterifications and mixing with tripalmitin will serve to bring the final product within the range just disclosed. Therefore, this invention is not limited to any one specific combination of interesterified coconut oil and tripalmitin.

The following are specific examples of the operation of the invention:

*Example 1*

Coconut oil is mixed with about 5% of its weight of the mixed glycerol esters of caproic, caprylic and capric acids obtained by esterification of the constituents in a well known manner. The mixture is warmed with stirring until the mass becomes homogeneous. While still stirring and maintaining the mixture in the liquid state, the glyceride esters of palmitic acid containing not over about 5% of the triglyceride of fatty acids of coconut oil adjacent thereto is added to said mixture in an amount equal to about 6% of the weight of coconut oil.

The thus modified coconut oil may then be incorporated in the usual margarine composition by procedures commonly used in the trade.

*Example 2*

A margarine oil is prepared from the following formulation:

80% palm kernel oil
20% coconut oil short chain glycerides
3.25% palm stearine added To the mixture of the palm kernel oil and coconut oil short chain glycerides there is added 1.5 lbs. of sodium methylate and the mixture maintained at a temperature of about 50° to 60° C. for a sufficient time to complete the interesterification of the palm kernel oil with the short chain glycerides. Usually 1½ to 2 hours is sufficient for reaction. The 3.25% of palm stearine is then added by physical mixing. The coconut oil contains glyceride esters of the following short chain fatty acids in the percentage indicated:

75% caprylic
20% capric
5% caproic

The resultant product is an excellent pale, bland margarine oil and has the following characteristics:

| | |
|---|---|
| Color (Lovibond) | 10 yellow, 1.0 red max. |
| Free fatty acid | 0.05 max. |
| Iodine value | 10.0 max. |
| Saponification value | 265±5. |
| M. P. (Wiley) | 95–100° F. |
| Initial fusion | 68–70° F. |
| M. P. (closed cup) | 107–109° F. |
| Setting point | 20–23° C. |
| Swift stability | 150 hours plus. |

*Example 3*

Coconut oil is hydrogenated to a low iodine number usually from 0.5 to 10.0 preferably 1.5 or lower. This oil is then used in place of the unhydrogenated coconut oil of Example 1. Or the final composition of Example 1 may be first made and then subjected to hydrogenation to a low iodine number. Such a margarine oil is more stable than the unhydrogenated oil and its keeping qualities are enhanced without adversely affecting the other properties thereof, such as plasticity and flavor.

The saponification number of the oil ranges from 260 to 275 and more specifically from about 265 to 270.

*Example 4*

In another aspect of the invention, interesterification of some of the constituents takes place. Hydrogenated coconut having a melting point of about 100° F. is mixed with about 10% by weight of the triglycerides of the following fatty acids in the stated proportions:

| | Percent |
|---|---|
| Caprylic acid | 80 |
| Capric acid | 15 |
| Caproic and lauric acids | 5 |

To this mixture there is added 1.5 lbs. of sodium methylate and the mixture maintained at a temperature of about 50° to 60° C. for a sufficient time to complete the interesterification of the coconut oil with the triglycerides of the lower fatty acids. Usually 1½ to 2 hours is sufficient for the reaction. The product is then refined, bleached and dried. The product has the following characteristics:

| | | |
|---|---|---|
| Iodine value | | 1.4 |
| Sapon. No | | 265–270 |
| Melting point (Wiley) | ° F | 77–78 |
| Setting point | ° C | 16–17 |

To the above product is added the glyceride ester of palmitic acid in the proportions of 93% of the modified coconut oil and 7% of the palmitic acid ester. The constituents are blended in a suitable mixing device, usually at a slightly elevated temperature sufficient to soften the palmitic acid ester and to cause it to blend more readily with the modified coconut oil. No chemical reaction takes place and the final mixture is a neutral solution of the two constituents. It has the following characteristics:

| | | |
|---|---|---|
| Iodine value | | 1.4 |
| Sapon. No | | 265–270 |
| Melting point (Wiley) | ° F | 96–98 |
| Setting point | ° C | 20–22 |

*Example 5*

In order to make a margarine from the products of any of the above examples, the following proportions of constituents are provided.

| | Lbs. |
|---|---|
| Margarine comp. of Ex. 4 | 1215 |
| Salt | 26 |
| Milk | 241 |
| Cream | 30 |
| Emulsifier | 4.5 |
| Lecithin | 2 |
| Coloring matter | 2.5 |

Any of the usual emulsifiers may be used, such as glycerol monostearate. The amounts of cream and milk may be varied and the cream may in some cases be omitted.

In producing the margarine from the above ingredients, one of the usual methods may be employed. The oil may be introduced into a mixing vessel and creamed to 140° F. The coloring matter, emulsifier and lecithin are added thereto and the mixture agitated until a smooth homogeneous oil is obtained. Vitamins may be added at this stage, if desired. Then the mixture is allowed to cool to about 125° F. and the milk and/or cream and salt which have been previously mixed together are gradually added to the oil with stirring during the cooling operation. Thereafter the composition is passed through a chill roll, flaked into thin sheets, passed through the complector and then extruded as the finished product.

The margarine made in accordance with the present invention is smooth to the touch, and is pleasant to the taste. When taken in the mouth there is no waxiness or chewiness. The margarine has a substantial body and maintains its form even in hot weather and it spreads in a satisfactory manner. At refrigerator temperatures the margarine is still plastic and is readily spread. It has a pleasant flavor and odor and it does not become rancid on long storage even at room temperatures.

In place of coconut oil other oils of the same type, such as babassu, palm kernel and the like, may be used. The oil may be unhydrogenated, but the hydrogenated oil is preferred. In the method of Example 4 where interesterification takes place, it is not necessary to use the triglycerides but the free acids and the glycerine may be the starting materials. The product may be used for other purposes than margarine. The composition of the lower fatty acids in the triglycerides may be varied considerably; for example they may contain 76 to 83 parts of caprylic, 12 to 19 parts of capric, and also 3 to 6 parts of a mixture of caproic and lauric acids.

By this method a base margarine oil is produced retaining the desirable qualities of coconut oil and correcting its defects, and having an iodine number safely below that of butter fat. By this procedure a difficult problem in margarine manufacture has been solved and by a different approach than heretofore attempted. Since vegetable margarine is a compound of oil and milk, the preparation must derive its desired flavor from cultured milk. This flavor and aroma is delicate and can be quickly overcome if opposed by any oil flavor. The only way to avoid this is the use exclusively of bland, stable coconut type oils. The latter oils if properly corrected and refined will remain bland for very extended periods, thus permitting the milk flavor to prevail indefinitely. Briefly the invention makes possible the exclusive use of corrected coconut type oils which will remain bland and stable in a margarine compound instead of the group of oils heretofore used, including cottonseed, soyabean, peanut etc., which will not remain bland in flavor or stable when mixed with the other ingredients of margarine.

I claim:

1. A fat which is a homogeneous combination of coconut type oil interesterified with from about 1% to 20% of the triglycerides of the lower fatty acids of coconut oil and blended with from about 1% to 15% of the triglycerides of the palmitic acid fraction of said coconut oil, said fat having a Wiley melting point of 95°–100° F. and a setting point of 20°–23° C.

2. A fat according to claim 1 wherein the coconut type oil is hydrogenated.

3. A fat which is a homogeneous combination of coconut type oil with from 4% to 8% of the triglycerides of the lower fatty acids of coconut oil and mixed with from about 3% to 6% of the triglycerides of the palmitic acid fraction of said coconut oil, said fat having a Wiley melting point of 95°–100° F. and a setting point of 20°–30° C.

4. A fat according to claim 1 wherein the lower fatty acids are caproic, caprylic and capric.

5. A fat according to claim 1 wherein the lower fatty acid esters are interesterified with said oil and the higher fatty acid esters are physically combined therewith.

6. A fat according to claim 5 which has a saponification number of 260–275 and an iodine number of not over about 10.

7. A fat produced by the interesterification of a coconut type oil with from 1% to 20% of the lower fatty acid glycerides of coconut oil followed by physical mixing with from 1% to 15% of the triglycerides of the palmitic acid fraction of said coconut oil, said fat having a Wiley melting point of 95°–100° F. and a setting point of 20°–23° C.

8. A fat produced according to claim 7 wherein the lower fatty acids are caproic, caprylic and capric.

9. A fat which is a homogeneous combination of coconut type oil interesterified with from about 1% to 20% of the triglycerides of the lower fatty acids of coconut oil and blended with from about 1% to 15% of a triglyceride stearine, said fat having a Wiley melting point of 95°–100° F. and a setting point of 20°–23° C.

References Cited in the file of this patent

UNITED STATES PATENTS

| | | |
|---|---|---|
| 1,342,827 | Schwarcman | June 8, 1920 |
| 2,309,949 | Gooding | Feb. 2, 1943 |
| 2,442,532 | Eckey | June 1, 1948 |
| 2,558,547 | Eckey | June 26, 1951 |
| 2,640,780 | Mattikov | June 2, 1953 |
| 2,667,418 | Barsky et al. | Jan. 26, 1954 |